United States Patent [19]

Kumm

[11] Patent Number: 5,176,581
[45] Date of Patent: Jan. 5, 1993

[54] SELF-ENERGIZED CONTROLLABLE BELT TENSIONER

[75] Inventor: Emerson L. Kumm, Tempe, Ariz.

[73] Assignee: Kumm Industries, Inc., Phoenix, Ariz.

[21] Appl. No.: 711,649

[22] Filed: Jun. 6, 1991

[51] Int. Cl.⁵ .............................................. F16H 7/08
[52] U.S. Cl. ..................................... 474/110; 474/136
[58] Field of Search ............... 474/110, 109, 101, 111, 474/148, 136

[56] References Cited

U.S. PATENT DOCUMENTS

| | | | |
|---|---|---|---|
| 2,310,081 | 2/1943 | Hill | 74/230.17 |
| 2,736,927 | 3/1956 | Truslow et al. | 474/110 X |
| 3,142,193 | 7/1964 | Polko et al. | 74/242.11 |
| 3,406,582 | 10/1968 | Frentzel | 474/110 |
| 3,995,399 | 12/1976 | Weiner et al. | 474/110 X |
| 4,151,756 | 5/1979 | Binder et al. | 74/242.11 |
| 4,216,678 | 8/1980 | Butterfield et al. | 474/12 |
| 4,249,425 | 2/1981 | Watson | 474/110 |
| 4,270,906 | 6/1981 | Kraft et al. | 474/135 |
| 4,276,038 | 6/1981 | Kraft | 474/110 |
| 4,411,638 | 10/1983 | Wilson | 474/136 |
| 4,432,743 | 2/1984 | Pitoiset | 474/14 |
| 4,509,935 | 4/1985 | Foster et al. | 474/138 |
| 4,533,341 | 8/1985 | Yokota | 474/109 |
| 4,557,709 | 12/1985 | St. John | 474/117 |
| 4,563,167 | 1/1986 | Foster | 474/135 |
| 4,571,223 | 2/1986 | Molloy | 474/133 |
| 4,596,538 | 6/1986 | Henderson | 474/135 |
| 4,639,239 | 1/1987 | Thirion de Briel | 474/8 |
| 4,728,317 | 3/1988 | Martz et al. | 474/136 |
| 4,772,248 | 9/1988 | De Briel | 474/14 |
| 4,854,921 | 8/1989 | Kumm | 474/70 |
| 4,881,927 | 11/1989 | Suzuki | 474/111 X |
| 4,932,926 | 6/1990 | Lauderbach et al. | 474/110 |
| 4,990,123 | 2/1991 | Krude | 474/110 X |

Primary Examiner—Rodney M. Lindsey
Attorney, Agent, or Firm—Richard G. Harrer; Charles E. Cates

[57] ABSTRACT

A variable speed drive system for prime mover driven accessories which includes a self-energized controllable belt tensioner in combination with a variable diameter pulley assembly. The tensioner, upon command, uses a pump continuously driven by a fixed diameter pulley positioned by a rotary or linear actuator to take up and tension the belt passing over the same pulley. In the variable speed drive, this tensioner functions typically together with a variable diameter pulley which operates on the belt by forces which are directed toward increasing the variable pulley diameter. A hydraulic flow system with appropriate pump, valves, lines, and actuator can all be self-contained in the rotary tensioner. Selenoid valves are used in an on-off fashion with an actuator to move a pulley arm attached to the actuator generating the required belt tension to decrease the variable pulley diameter as desired upon command.

13 Claims, 5 Drawing Sheets

SELF-ENERGIZED CONTROLLABLE BELT TENSIONER

FIELD OF THE INVENTION

This invention relates to the engine accessory and supercharger drive art and, more particularly, to a critical component in a variable speed engine accessory drive by which engine-driven accessories are controlled and limited in speed as the engine speed is increased. This component is the belt tensioner for variable diameter pulleys that provides the belt take-up with decrease in the variable pulley diameter.

BACKGROUND OF THE INVENTION

Internal combustion engines typically drive several accessories through a belt arrangement operating off the engine crankshaft. For example, an exemplary modern vehicle engine might drive such accessories as: air pump, alternator, fan, air conditioning compressor, power steering pump and water pump. A well recognized problem with such accessories as conventionally belt driven is that their rate of rotation is proportional to engine speed. Consequently, the designs of the accessories have been subject to substantial compromise in order to insure adequate performance at low engine speeds and dependability and reasonable longevity at high engine speeds. In recognition of these contradictory requirements, it has been proposed that a variable speed accessory drive be employed which would serve to drive the accessories relatively faster at lower engine speeds and relatively slower at higher engine speeds.

If such an effective variable speed accessory drive can be realized, numerous benefits would be obtained. For example: the life of the bearings of such accessories would be greatly extended, power absorption at high speed would be greatly reduced such that more engine net power output would be available, fuel economy would be improved, better accessory performance at low engine speeds (such as idle) would be obtained and smaller accessories could be employed with resulting savings in initial cost and weight.

In the variable speed accessory drives which have been proposed in the past, most have employed V-belt drives in which the driving and/or driven pulley is rendered variable in diameter by axially adjusting (under the influence of some speed responsive control system) the pulley sheave sections in order that the V-belt will ride at various depths in the variable diameter pulley. The fixed positions of the driving and driven pulley axes together with the fixed belt length results in the belt being tensioned and positioned radially in one of the driving or driven pulleys in an inverse fashion to the other of the driving or driven pulleys in a manner well known to the designers of such variable speed drives. Flat belt variable speed accessory drives have also been proposed that offer significant advantages relative to the V-belt drives. In either the flat belt or V-belt variable speed accessory drive systems, there is a major reduction in the complexity and cost by using only one variable diameter pulley and absorbing the required belt takeup with a belt tensioner. It is possible to independently control and change the diameter of the rotating pulley about which the belt passes using the belt tensioner as a dependently operating element—i.e., tensioning the belt by an idler pulley positioned on an arm rotated and acted upon by a spring. However, there are significant problems associated with using an independent control for varying the diameter of a rotating pulley that results in increased weight, complexity and cost. The overall system is rendered lower in weight, complexity and cost by employing the belt tensioner of this invention as the active speed ratio control—the independently operating element—and using as the dependent operating element, the variable diameter pulley involving integral spring and centrifugal weight force components.

A typical variable diameter driving pulley is shown in U.S. Pat. No. 2,310,081 where the centrifugal force of balls is used to change the effective belt radius in a V-belt pulley in order to drive an automobile generator at a more constant speed. The simpler belt takeup tensioner of this invention can replace one of the V-belt pulleys used in U.S. Pat. Nos. 4,216,678, 4,432,743 and 4,639,239, all of which are limited to being passive control systems. Their speed ratios are changed on a predetermined schedule of pulley speed and torque rather than by command as obtained by this invention. However, there are also more complicated and costly active control systems such as shown in U.S. Pat. No. 4,772,248, which uses hydraulic fluid control pressure to act in one V-belt pulley to change the speed ratio with another variable diameter pulley reacting by using a diaphragm spring. U.S. Pat. No. 4,854,921 involves a complicated active control system employing a flat belt driving pulley with a spring operated tensioner. In this invention, a controlled hydraulic pressure changes the accessory to engine speed ratio upon command. Thus, this invention has basic advantages in permitting the design and use of simpler, less costly variable diameter pulleys.

Many patents have been issued for belt tensioners that operate to tension belts passing around fixed diameter pulleys. These patents usually employ spring loaded idler pulleys in various arrangements to tension the belt. Spiral springs are often used to rotate the arm on which an idler pulley is used to tension the belt. Such arrangements are shown in U.S. Pat. No. 4,557,709 to R. C. St. John; in U.S. Pat. No. 4,563,167 to R. C. Foster; and U.S. Pat. No. 4,596,538 to D. D. Henderson. Belleville springs are used in belt tensioning arrangement shown in U.S. Pat. No. 4,151,756 to R. Binder, et al; in U.S. Pat. No. 4,509,935 to R. C. Foster, et al; and in U.S. Pat. No. 4,270,906 to D. H. Kraft and D. M. Rinaldo. Other spring arrangements include helical springs as well as a rubber band spring (U.S. Pat. No. 4,571,223 to E. W. Molloy). Hydraulic pressure is also used to operate other belt tensioners, such as shown in U.S. Pat. No. 4,276,038 to D. H. Kraft or as shown in U.S. Pat. No. 3,142,193 to P. P. Polko et al. Also, U.S. Pat. No. 4,249,425 to R. D. Watson employs a vacuum motor stroked by the engine intake vacuum to tension the belt passing around an idler pulley. All of the above tensioners are basically different from this invention, being passive control systems—not under arbitrary command such as the system of this invention which can operate in incremental steps to change the operating belt radius in an associated pulley. My invention is directed to a variable speed accessory (and supercharger) belt drive which permits a comparatively low cost and low weight system to be obtained employing only one variable diameter pulley with an active tensioner control. The belt shape, depending on the variable diameter pulley, can be flat, V-ribbed, Vee or other cross-section.

OBJECTS OF THE INVENTION

Consequently, it is a broad object of my invention to provide an improved engine accessory and/or supercharger drive.

It is a more particular object of my invention to self energize the belt tensioner for tensioning and changing the variable pulley belt diameter upon an external command.

It is a still more specific object of my invention to minimize the control work and power requirement.

Another object of my invention is to provide an active speed ratio control that is simple and reliable.

A still further object of my invention is to minimize the overall control system and tensioner size, weight, and cost.

SUMMARY OF THE INVENTION this invention includes a belt tensioner in combination with a variable speed drive, which tensioner, upon command, uses a pump continuously driven by a fixed diameter pulley positioned by a rotary or linear actuator to take up and tension the belt passing over the same pulley. In the variable speed drive, this tensioner functions typically together with a variable diameter pulley which operates on the belt by forces which are directed toward increasing the variable pulley diameter. A hydraulic flow system with appropriate pump, valves, lines, and actuator can all be self-contained in the rotary tensioner. Solenoid valves are used in an on-off fashion with an actuator to move a pulley arm attached to the actuator generating the required belt tension to decrease the variable pulley diameter as desired upon command.

DESCRIPTION OF THE DRAWINGS the subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

In the discussion of an exemplary embodiment of the invention which follows, emphasis is placed on a configuration in which only the driving pulley of a belt driven engine accessory system is variable in diameter. It will be understood, however, that one or more of a system's driven pulleys can be rendered variable in diameter using this belt tensioner and the driving pulley may or may not be variable in such a system.

Figure 1:
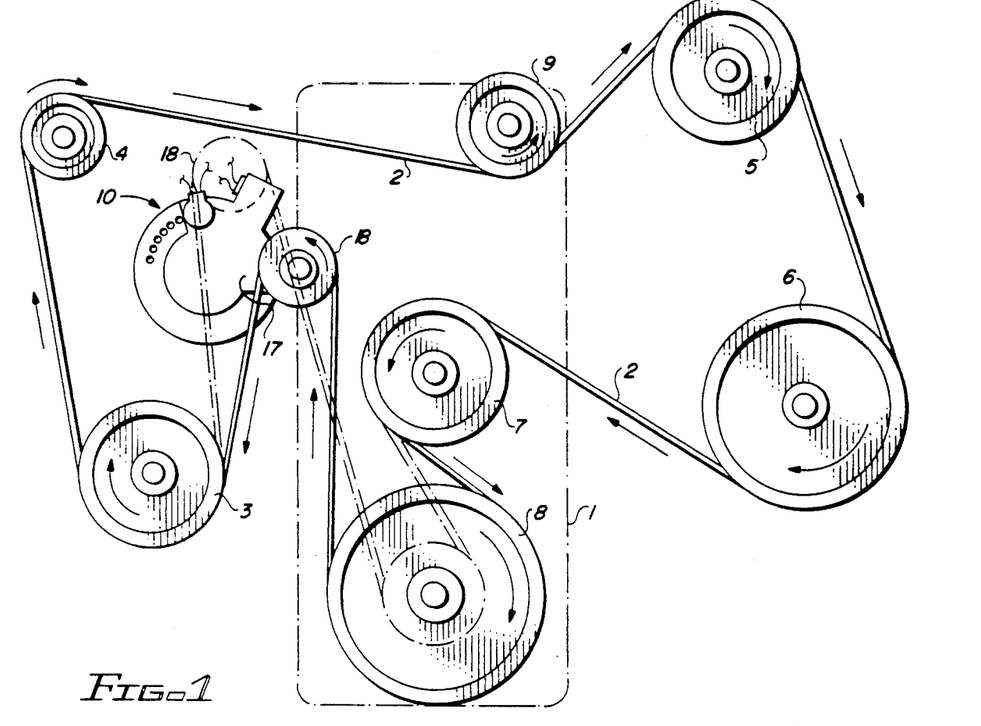
FIG. 1 is a generalized view representing an engine with an array of belt driven accessories with a self energized controllable rotary actuated belt tensioner.

Referring now to FIG. 1, a generalized view of an engine 1 having an array of accessories (represented by their respective pulses) driven by a belt 2 is shown. The accessories, which are simply shown as exemplary as will be understood by those skilled in the art, include air pump 3, alternator 4, air conditioning compressor 5, power steering pump 6, and water pump 7 (which typically also carries a fan)—all driven by a variable diameter pulley assembly 8 which is coupled to the engine crankshaft. A stationary idler 9 may be employed to insure adequate wrap around the pulleys of the alternator 4 and the air conditioning compressor 5. The rotary actuated tensioner 10 of this invention employs a pulley 18 located on a moveable arm 17 which arm can be moved, upon command, to change the effective diameter of the variable diameter pulley assembly 8. Typically, the pulley assembly 8 is spring loaded to give forces directed toward increasing the belt radius thus providing adequate belt tension in the operation.

Figures 2, 5A:
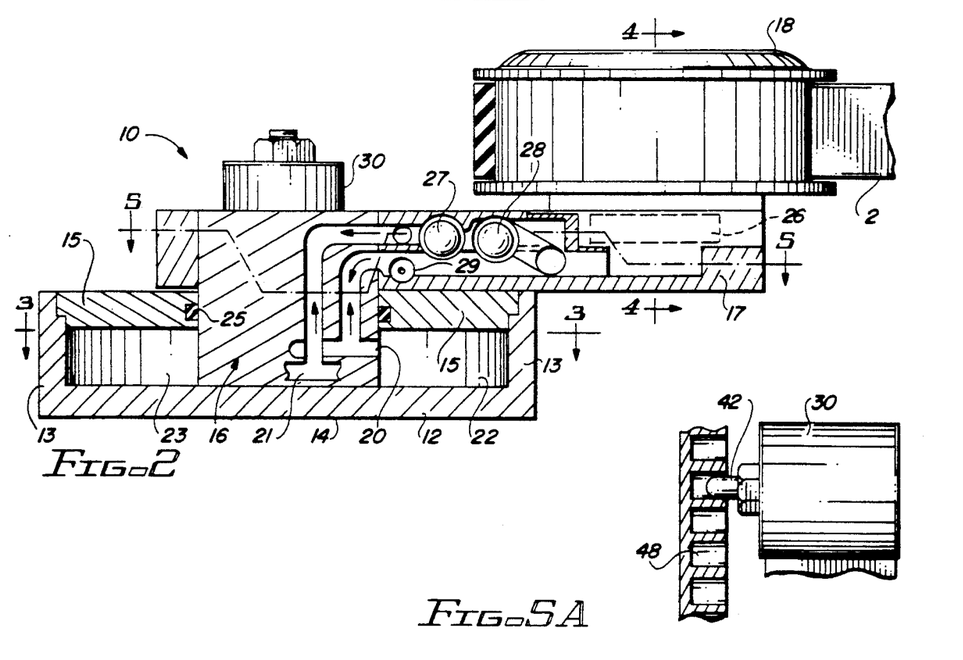
FIG. 2 is a partially cut-away perspective view of the self energized controllable belt tensioner with rotary actuator.
FIG. 5A is a cross sectional view taken along the lines 5A—5A of FIG. 5.
Figure 5:
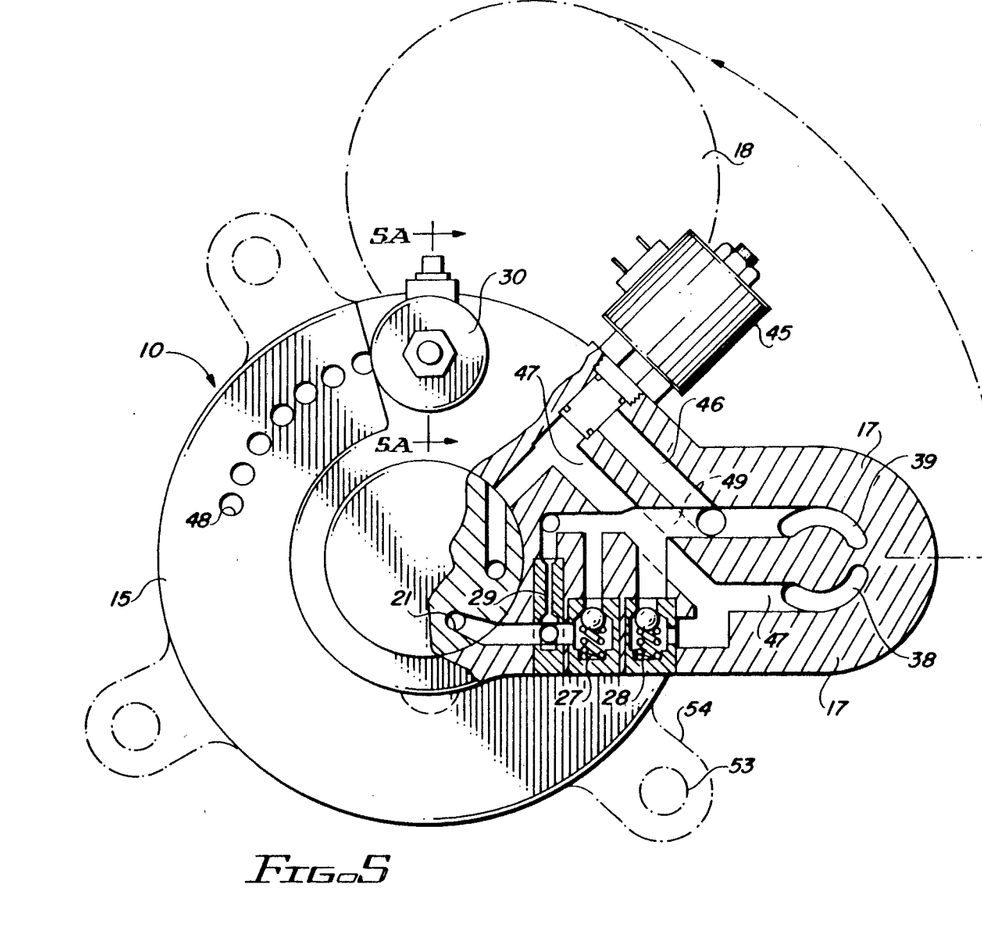
FIG. 5 is a partially cut away perspective view of the hydraulic flow lines and controls taken along the line 5—5 of FIG. 2.

Referring to FIG. 2, certain fundamental elements of the belt tensioner are presented. Tensioner 10 includes a housing 14 having base 12, side walls 13 and cover 15. As shown in FIG. 5, the tensioner base 12 is provided with flanges 54 with openings 53 for mounting the tensioner on the engine or other appropriate support. Actuator means shown in part generally at 16 of FIG. 2 are rotatably mounted within housing 14 and arm 17 is rigidly secured to center section 16a of actuator means 16 (see FIG. 6). Pulley 18 is positioned at the end of arm 17 and is driven by flat belt 2. Flow passages 20 and 21 are shown in the center section 16a of actuator means 16 and are connected to other passages in the arm 17 as will be discussed and clarified subsequently. Hydraulic fluid is contained in chambers 22 and 23 and a seal 25 is employed to prevent external leakage. A hydraulic fluid driven gerotor type pump 26 is located on shaft 35 (see FIG. 4) of the pulley 18 and under pulley 18. Certain of the control elements shown in FIG. 2 include a check valve 27, a pressure relief valve 28, a flow restrictor 29, and a lock pin solenoid 30. The operation of these elements will be discussed subsequently.

Figures 3, 4:
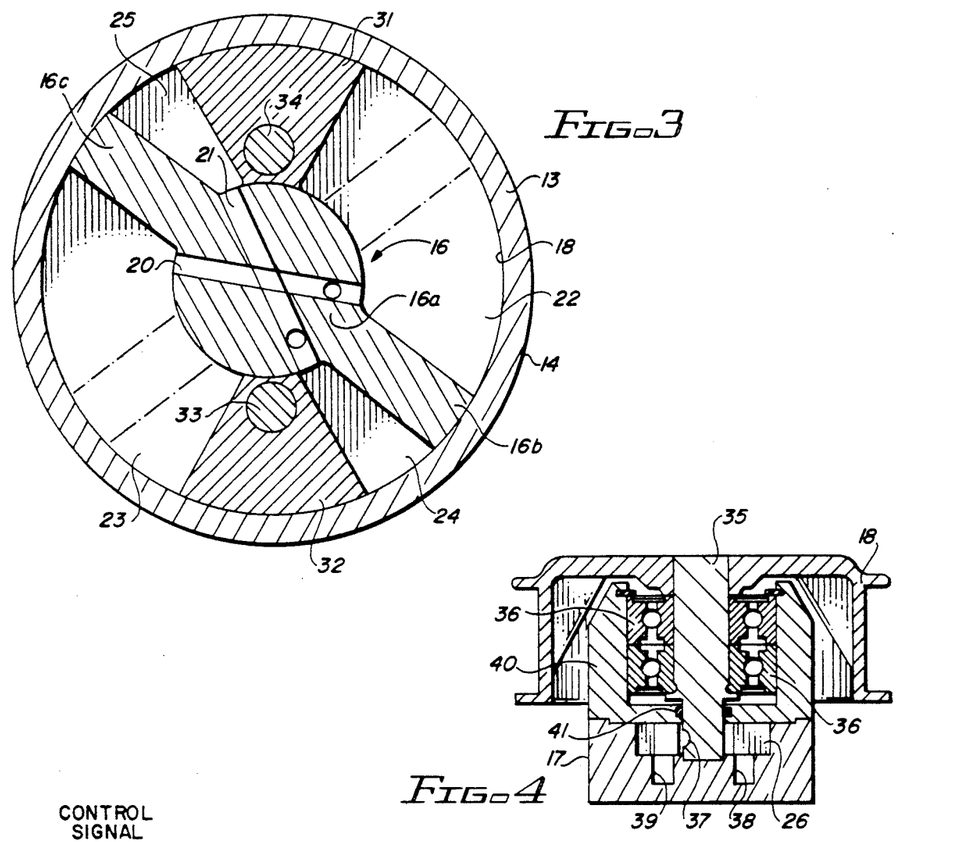
FIG. 3 is a cross-sectional view of a rotary hydraulic actuator in the belt tensioner taken along the lines 3—3 of FIG. 2.
FIG. 4 is a cross-sectional view of the hydraulic pump driven by the pulley taken along the lines 4—4 of FIG. 2.

FIG. 3 shows in cross section the hydraulic actuator means 16 positioned within housing 14 and which is rotatably mounted within housing 14 to operate and move attached pulley arm 17. As shown in FIG. 3, actuator means 16 includes a cylindrical shaped section 16a positioned in the center of housing 14 and provided with passages 20 and 21 and integral extending arms 16b and 16c. Also positioned in housing 14 are opposed and generally pie shaped sections 31 and 32 which are non-movable and located on base 12 of housing 14 by means of pins 33 and 34. Sections 31 and 32 together with arms 16b and 16c form two sets of opposed chambers 22, 23 and 24, 25. Opposed chambers 22 and 23 are of substantially equal volume and opposed chambers 24 and 25 are of substantially equal volume. Passage 21 connects chambers 24 and 25 and passage 20 connects chambers 22 and 23. It will be understood that the volume of each of chambers 22, 23, 24 and 25 will vary in response to rotation of actuator arms 16b and 16c within the interior of housing 14. Thus, if hydraulic fluid under pressure from the pump 26 flows from passage 21 into opposed chambers 24 and 25 of housing 14 it acts on the actuator arms 16b and 16c to rotate actuator 16 in a counter-clockwise direction. Such counter-clockwise rotation causes a reduction in the volume of chambers 22 and 23 which in turn causes hydraulic fluid under pressure from chambers 22 and 23 to enter passage 20. The hydraulic fluid flow is reversed if the actuator rotates in the opposite (clockwise) direction. Any significant leakage between the two sets of opposed chambers 22, 23 and 24, 25 is prevented by close fits of the ends of actuator arms 16a and 16b to the interior of side wall 13 of housing 14 and the sides of center section 16a of actuator 16 to the ends of housing sections 31 and 32.

FIG. 4 is a cross section of the pulley-pump arrangement. Flat belt pulley 18 is secured to shaft 35 which is supported on bearings 36 and drivingly connected by key 37 to a gerotor type pump 26. A gerotor pump is a positive displacement pump consisting of two elements—an inner and outer rotor. The inner rotor has one less tooth than the outer rotor and has its center line positioned at a fixed eccentricity from the center line of the outer rotor. Inlet and outlet flow ports 38 and 39 respectively from pump 26 are contained in pulley arm 17. The bearing housing 40 is part of the pulley arm 17. A dynamic seal 41 is used to prevent hydraulic fluid leaking axially on shaft 35.

FIG. 5 shows the hydraulic fluid flow passages in a partially cut away perspective view of the tensioner together with the tensioner controls. As shown, solenoid valve 45 is mounted to arm 17 and controls one of the fluid flow passages in the arm. In the situation where the solenoid valve is non-energized, that is the valve is open, hydraulic fluid from the pump discharge or outlet port 39 flows through the open (non-energized) bypass solenoid valve 45 and back to the inlet port 38 using flow passages 46 and 47. When bypass solenoid valve 45 is energized, closing the valve, the lock pin solenoid 30 is also energized which results in a withdrawal of lock pin 42 (see FIG. 5A) from one of the holes 48 in the cover plate 15. Because the solenoid valve 45 is closed, hydraulic fluid under pressure from discharge port 39 of pump 26 is directed to flow passage 49 and substantially all of the fluid then passes through check valve 27 into passage 21 and then into chambers 24 and 25 (see FIG. 3). The pressurized fluid in chambers 24 and 25 causes actuator 16 and pulley arm 17 to move in a counter-clockwise direction increasing the tension on belt 2. The discharge pressure of pump 26 increases as necessary to move the actuator 16 and consequently pulley arm 17 in a counter-clockwise direction. During this movement the volume of chambers 22 and 23 is reduced and consequently hydraulic fluid is discharged from chambers 22 and 23 through passages 20 and 47 and back to the pump inlet port 38. De-energizing the lock pin solenoid 30 is normally accomplished simultaneously with de-energizing the bypass solenoid valve 45 which then permits the spring loaded lock pin 42 of solenoid 30 to enter one of the holes 48 to lock the tensioner arm 17 in the new position. The increased tension on belt 2 during this operation reduces the diameter of the variable pulley 8 by overcoming the radial forces in the variable diameter pulley (FIG. 1). A pressure relief valve 28 prevents excessive pressure from being applied by the pump 26 to the system by discharging flow from passage 49 to line 47.

The opposite operation, that is moving the arm and pulley in a clockwise direction, is accomplished as follows. The pulley arm 17 is moved in a clockwise direction by energizing both the lock pin solenoid 30 and the bypass solenoid valve 45 (closing the valve) to cause retraction of lock pin 42 from hole 48. The operation of the bypass solenoid valve releases the side load on the lock pin 42 of the lock pin solenoid 30 (FIG. 5A) for its operation. The bypass solenoid valve 45 is then de-energized (valve open) relieving the actuator pressure. This permits the radial forces due to spring and centrifugal forces in the variable diameter driving pulley 8 to increase the diameter of the pulley, causing the pulley arm 17 with the pulley 18 to rotate in a clockwise direction. In order that adequate belt tension will always exist to prevent belt slippage, the check valve 27 and flow restrictor 29 cause this pulley arm 17 rotational speed to be relatively slow.

Thus with respect to the embodiment just described, energizing both the bypass solenoid valve 45 and lock pin solenoid 30 causes pulley arm 17 with its pulley 18 to rotate in a counter-clockwise direction increasing the tension on belt 2 and thereby causing a reduction in the diameter of variable diameter pulley 8 which slows down the rotation of the various accessories. On the other hand, energizing the lock pin solenoid 30 and the solenoid valve 45 followed by de-energizing the solenoid valve 45 allows pulley arm 17 with pulley 18 to rotate in a clockwise direction as a result of the variable diameter pulley 8 increasing its diameter. An increase in the diameter of the variable diameter pulley results in an increase in the speed of rotation of the accessories.

Figure 6:
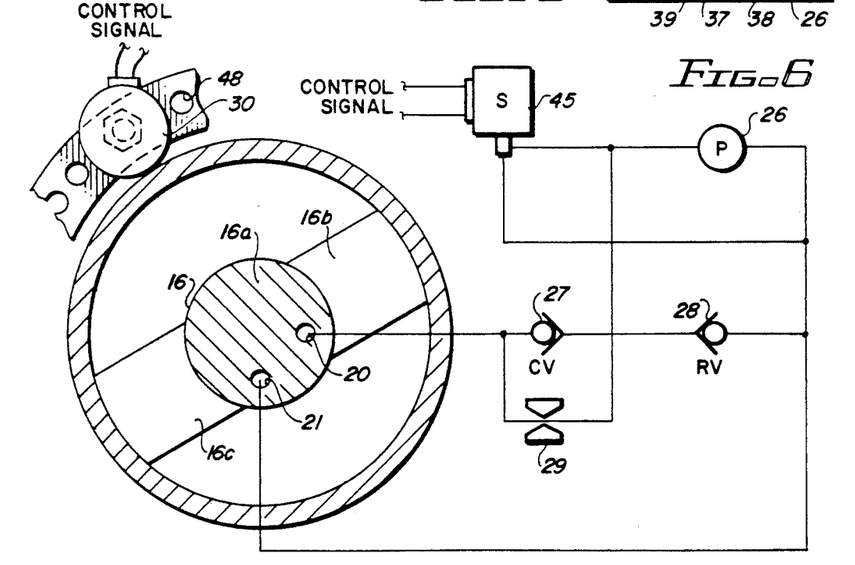
FIG. 6 shows in schematic form the control arrangement for moving and positioning the rotary actuated belt tensioner of FIG. 2.

The tensioner control system is shown schematically in FIG. 6. The flows are as previously described with respect to FIG. 5 but are more easily seen in a schematic layout. It will be seen that if the normally open (de-energized) solenoid valve 45 is closed even momentarily the flow of hydraulic fluid from pump 26 must discharge through the check valve 27 (a small amount will flow through the flow restrictor 29) into operating the rotary actuator 16 in a counter-clockwise direction. With the relatively incompressible hydraulic fluid, the discharge pressure from pump 26 will increase very rapidly to move the rotary actuator to take the flow discharge. Hence, a relatively small actuator can easily develop a relatively large torque as required to rapidly change the diameter of the driving variable diameter pulley 8. This is necessary to prevent overspeeding of the accessories (FIG. 1) when the operation starts with the engine being rapidly accelerated and the accessories at their maximum speed relative to the engine speed (maximum diameter of variable pulley 8). The pressure relief valve 28 prevents excessive pressures from being developed. The resulting counter-clockwise movement of the pulley arm 17 results in a belt takeup which gives a smaller diameter of the variable diameter driving pulley 8, causing the accessory speeds to decrease in a relative manner when compared to the crank shaft speed on the variable diameter pulley 8.

Increasing the speed of the accessories when desired can be accomplished much more slowly. Here, it is desirable to use a momentary signal (100-300 milliseconds) to the bypass solenoid valve 45 as previously mentioned to open the valve together with energizing the pin lock solenoid 30 to free the pin from large side loads during operation. The hydraulic flows are reversed when the radial forces in the variable diameter driving pulley 8 increase its diameter and cause the pulley arm 17 to rotate in a clockwise direction. In this operation, it is necessary to maintain belt tension by restricting the rotational speed of the pulley arm 17 in the clockwise direction. Hence the need for the check valve 27 and flow restrictor 29. The command signals energizing the operation of the tensioner in either direction are cut off as desired at any time a desired speed ratio is achieved. Hence, the self energized controllable tensioner will operate without any external power whenever it is locked in position by the lock pin solenoid. With the bypass solenoid valve 45 open, the power consumption of the system is very small indeed—normally less than 0.02 horse power.

While the above describes in detail the use of a rotary actuator arrangement to provide the required belt take up from a variable diameter pulley, similarly, a linear actuator employing a hydraulically operated piston to move the idler pulley which operates a pump and gives the required belt takeup may be employed.

Figures 7A, 7B, 8:
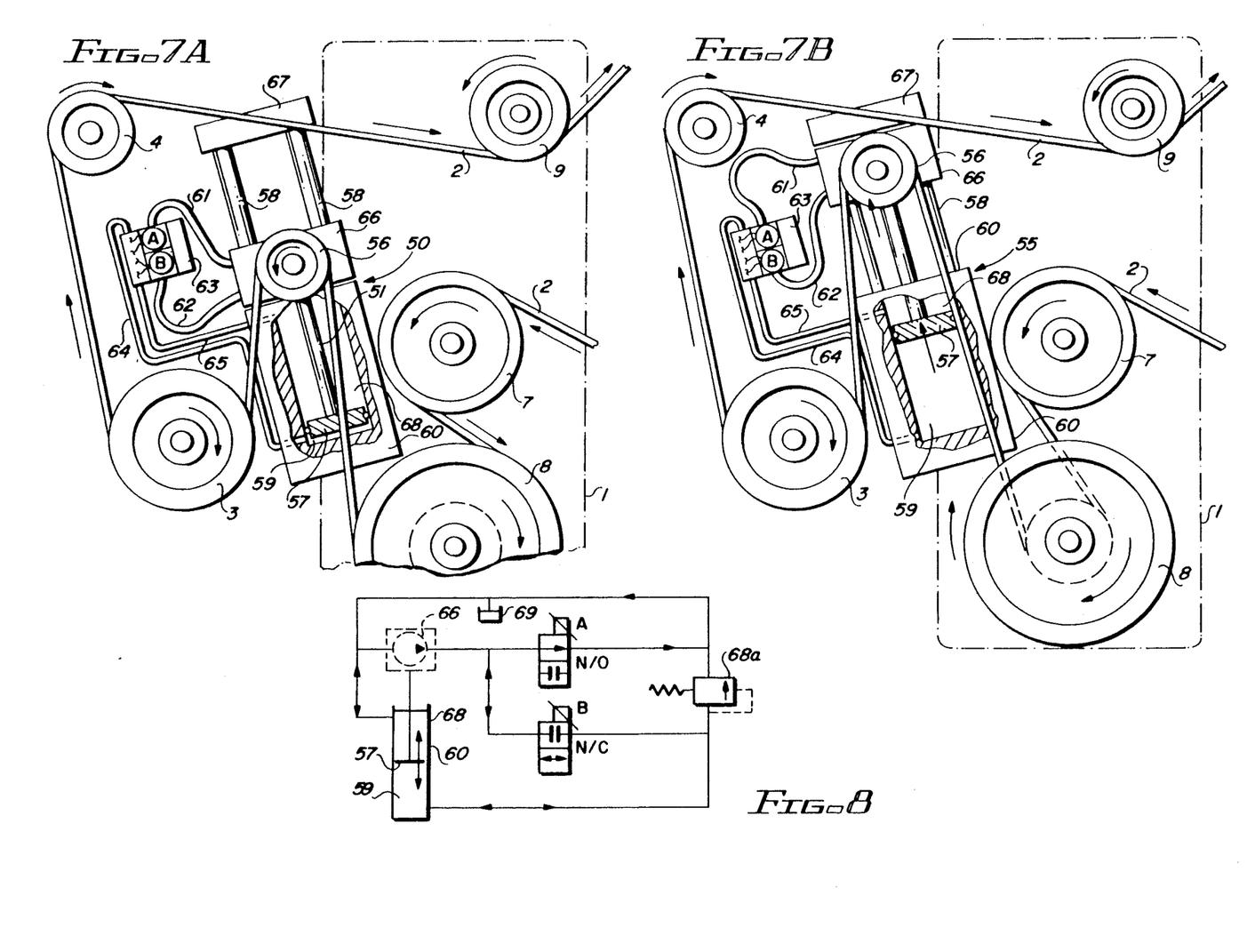
FIGS. 7A and 7B are generalized views representing an engine with an array of belt driven accessories with a linear actuated self energized controllable belt tensioner.
FIG. 8 is a hydraulic flow schematic of the hydraulic tensioner with linear actuator.

FIGS. 7A and 7B show another embodiment which employs a linear actuated tensioner 50 in place of the rotary actuated tensioner 10 shown in FIG. 1. Here, an engine 1 having an array of accessories as previously described with respect to FIG. 1 are all driven by a belt 2 which is driven in turn by a variable diameter pulley assembly 8 coupled to the engine crankshaft. Pulley 56, which is mounted to movable support 66 and driven by belt 2 operates a pump (not shown) in the same fashion as previously described for pump 26 in the rotary actuated arm 17 of rotary actuated tensioner 10. As shown in FIGS. 7A and 7B, a piston 57 and its associated piston rod 51 operate within hydraulic cylinder 60. An end of piston rod 51 is secured to pulley support 66 which in turn is slideably mounted on a pair of guide rods 58, one end of each guide rod 58 is secured to the top of cylinder 60 and the other end is secured to stop member 67. When fluid under high pressure is applied to chamber 59 of the hydraulic cylinder 60, piston 57 and rod 51 begin to move upwardly in cylinder 60 and, as shown in FIG. 7B cause pulley support 66 and pulley 56 to move outwardly along guide rods 58. As shown in FIG. 7B, this outward movement of the pulley 56 away from the variable radius driving pulley 8 causes the operating diameter in the driving pulley 8 to decrease. A flexible hydraulic high pressure hose 61 and low pressure hose 62 connect from the pulley driven pump outlet and inlet to a fixed hydraulic block 63. Solenoid valves A and B mounted on hydraulic block 63 control the generation of pressure by the pulley driven pump and the hydraulic flow to and from the hydraulic cylinder 60 via the hydraulic lines 64 and 65. Line 64 connects to chamber 59 which is the high pressure side of the piston 57 whereas line 65 connects to chamber 68 which is the low pressure side of the piston 57.

The operation of the linear actuated tensioner 55 can be illustrated more completely using the hydraulic flow diagram of FIG. 8. Here pump 66 which is driven by the pulley 56 is shown to supply fluid to the two solenoid valves A and B. Solenoid valve A is normally open (N/O), whereas solenoid B is normally closed (N/C). The flows as shown in FIG. 8 are in the pump bypass mode with the linear actuator in a holding position. This is possible with a linear actuator using the solenoid valve B in closed position since a piston in a hydraulic cylinder can be sealed so as not to bypass any significant amount of fluid which is very difficult with a rotary hydraulic actuator. The incompressibility of the oil then holds the pump 66 and associated pulley 56 in a fixed position. When it is desired to extend piston 57 and pulley 56 outward, both solenoid valves A and B are energized (valve A closes and valve B opens) resulting in high pressure hydraulic flow passing to chamber 59 of cylinder 60. Hydraulic fluid is then forced out of the chamber 68 back to the pump inlet as the piston 57 moves in an outward direction. A pressure relief valve 68a is set at the maximum desired pressure to prevent excessive pressures from occurring. When the linear extension of the pulley 56 has resulted in the desired reduction in the pulley diameter of the variable diameter driving pulley 8 and lower accessory speeds, the two solenoid valves A and B are de-energized causing the linear actuator to hold in a fixed position. When it is desired to retract the pulley 56 and piston 57, solenoid valve B is energized permitting fluid to flow from chamber 59 to the pump discharge line. The spring and centrifugal forces in the variable diameter pulley 8 are always directed to retract the pulley 56 and piston 57 whenever possible. When the linear retraction of the pulley 56 has resulted in the desired increase in the diameter of the driving pulley 8 with resulting higher accessory speeds, solenoid valve B is de-energized causing the linear actuator to hold in a fixed position. A small fluid reservoir 69 is required with the linear actuator to provide makeup fluid to chamber 59 due to the slightly unequal volume changes of chambers 68 and 59 during movement of the piston 57. Very low pump power is required in the holding position as in the previous rotary actuator arrangement.

The embodiment shown in FIGS. 7A and 7B employ a stationary actuator cylinder 60 with a moveable piston 57. Although not shown, an alternative embodiment could employ a moveable actuator cylinder with a stationary piston. Such an embodiment would allow solenoid valves A and B to be mounted with the pulley driven pump 56 on the moveable actuator cylinder eliminating the need for flexible lines 61 and 62.

Figure 9A:
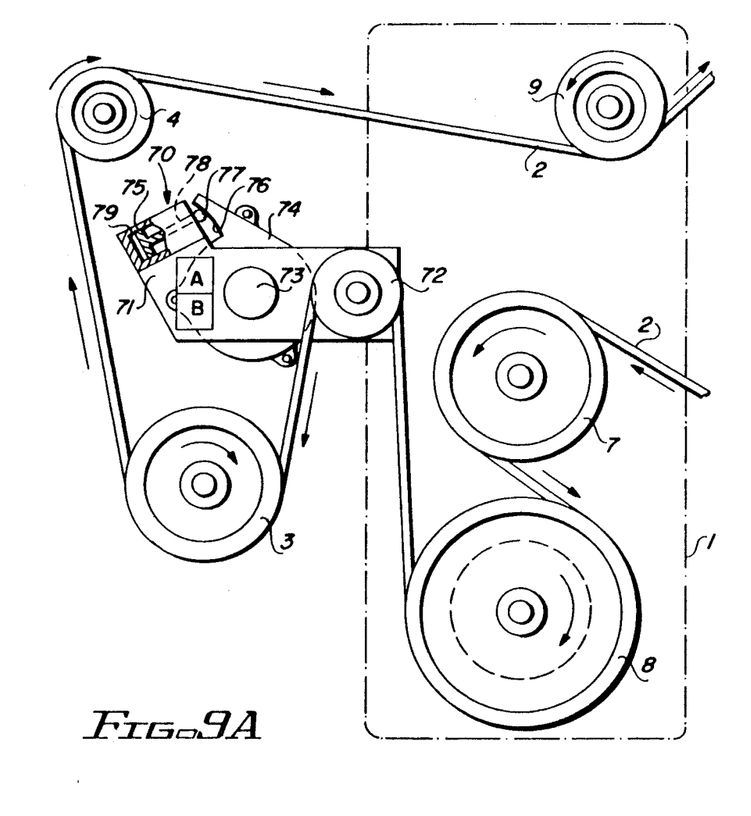
FIGS. 9A and 9B are generalized views representing an engine with an array of belt driven accessories using a self energized controllable belt tensioner which employs a linear actuator to rotate the belt tensioner pulley position for belt takeup.
Figure 9B:
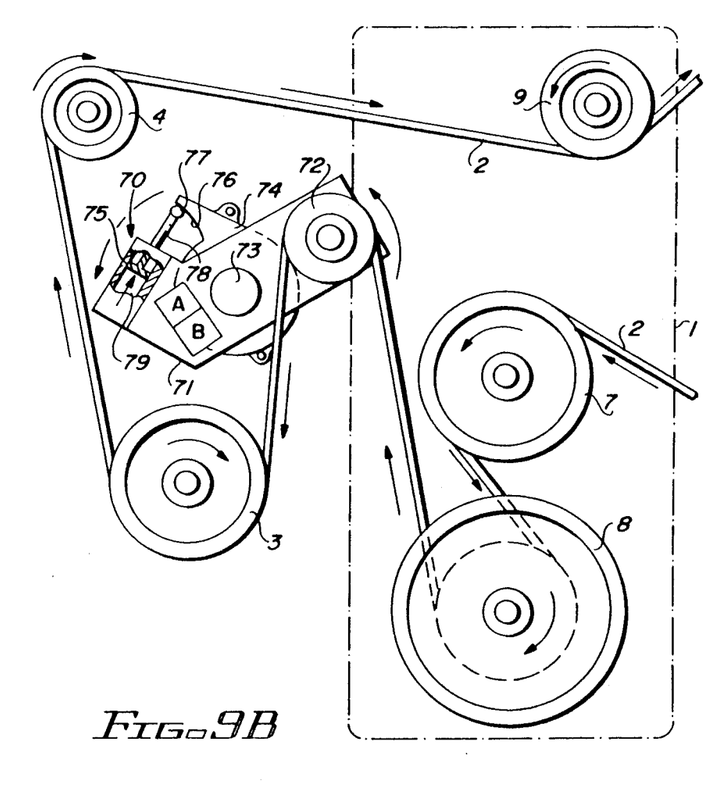

Another embodiment of a linear hydraulic actuator is shown in FIGS. 9A and 9B wherein the linear hydraulic actuator 70 is mounted on rotary arm 71 together with pulley 72 and its associated pump (not shown) and is used to move the pulley and give the desired belt takeup. Arm 71 rotates on stationary shaft 73 which is rigidly attached to base plate 74 which in turn is mounted on engine 1. Rod 78 of piston 75 of linear hydraulic actuator 70 pushes against a stationary curved ramp 76 using roller bearing follower 77 which is mounted at the end of piston rod 78. Stationary curved ramp 76 causes the hydraulic piston to have very small side loads in the linear hydraulic actuator 70. As shown best in FIG. 9B, when it is desired to reduce the diameter of the variable diameter driving pulley 8, fluid under high pressure is delivered to chamber 79 of actuator 70 causing piston 75 and its associated rod 78 to move outwardly, rod 78 and roller bearing follower 77 push against curved ramp 76 of arm 71 causing pulley 72 to extend outwardly away from pulley 8 causing the operating diameter of pulley 8 to decrease. The embodiment shown in FIGS.

9A and 9B can employ the same hydraulic fluid flow and control arrangement as shown in FIG. 8.

The foregoing discussion has shown several typical arrangements for hydraulically operated actuators to move a pulley operated pump in a system in which it is the driving pulley which is rendered variable in diameter responsive on commands to the self energized belt tensioner.

However, as previously mentioned, it is within the purview of the invention to provide variable diameter capability to one or more of the driven pulleys in conjunction with a fixed or variable diameter driving pulley. Also, fixed diameter pulleys may be driven by the same belt driving the variable diameter pulley. Further, the variable diameter driven pulley may be mounted on the shaft of an accessory, i.e., a power steering pump, to drive said accessory while transmitting power to other accessories. Alternatively, the variable diameter driven pulley with the fixed diameter pulley for driving the accessories may be bearing mounted on a stationary support and yet drive another accessory by a shaft rotating through the stationary support concentric with the variable diameter pulley.

In addition, although the invention has been described in the exemplary environment of an engine driving rotating accessories, those skilled in the art will appreciate that the prime mover need not necessarily be an engine, and other prime mover environments, such as electric motors, are contemplated.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A variable speed drive system for prime mover driven accessories, said system comprising:
    A) a prime mover having a rotating output pulley;
    B) a pulley affixed to the rotating component of an accessory to be driven by said prime mover;
    C) a variable diameter pulley assembly; and
    D) a tensioner, with said prime mover, said accessory, said variable diameter pulley assembly and said tensioner being operably connected by means of a continuous belt, said tensioner including:
       1) pump means driven by belt engaging means;
       2) hydraulic actuator means operably connected to said pump means;
       3) said belt engaging means operably positioned by said actuator means whereby movement of said actuator means results in movement of said belt engaging means resulting in a change in the variable pulley belt diameter; and
       4) valve means to control pressure and fluid flow to and from said actuator means.

2. The system of claim 1 wherein said hydraulic actuator means is a rotary hydraulic actuator and wherein hydraulic means are used upon command to fix the position of said belt engaging means.

3. The system of claim 2 wherein mechanical means are used to fix the position of said belt engaging means.

4. The system of claim 1 wherein said hydraulic actuator means is a linear hydraulic and wherein hydraulic means are used to fix the position of said belt engaging means.

5. The system of claim 4 wherein mechanical means are used to fix the position of said belt engaging means.

6. The system of claim 1 wherein the variable diameter pulley assembly is the driving pulley.

7. The system of claim 1 wherein the variable diameter pulley assembly is the driven pulley.

8. The system of claim 2 wherein said pump means is provided with inlet and outlet ports, fluid passage means operably connecting said ports to said rotary hydraulic actuator, and control means to operate said valve means and to lock or unlock said belt engaging means in a variety of positions.

9. The drive system of claim 8 wherein said rotary actuator further includes a cylindrical shaped section positioned in said housing with opposed radiating arms the ends of which contact the interior wall of said housing; said section and said arms rotatable within said housing; a pair of opposed and non-movable sections positioned within said housing with an end of each contacting said rotatable center section, said opposed radiating arms and said opposed non-movable sections forming two sets of opposed chambers within said housing and whereby rotation of said section and arms will vary the volumes of said chambers; and wherein said fluid passage means operably connects said inlet port to a first set of said opposed chambers and the outlet port to a second set of said opposed chambers.

10. The system of claim 9 wherein each opposed chamber of a set of chambers is of substantially equal volume.

11. The system of claim 4 wherein said pump means is provided with inlet and outlet ports, and wherein said linear hydraulic actuator includes a cylinder having a piston and rod moveable therein, fluid passage means operably connecting said ports to the interior of said cylinder, and control means to operate said valve means.

12. The system of claim 11 wherein said piston forms two chambers with said cylinder, a high pressure chamber and a lower pressure chamber, and wherein a fluid passage means is connected to each of said chambers.

13. The system of claim 12 wherein fluid under pressure from said outlet port is applied to said high pressure chamber, causing said piston and rod to move in a direction such that said belt engaging means is moved away from said variable radius driving pulley causing the operating diameter in said pulley to be decreased.

* * * * *